May 4, 1954 W. H. MYERS ET AL 2,677,346

TELEVISION RECEIVER TUNING INDICATOR

Filed Feb. 19, 1952 2 Sheets-Sheet 1

INVENTORS.
WILLIAM H. MYERS.
CARL REYNOLDS Jr.
BY Alden D. Redfield
ATTORNEY.

May 4, 1954 W. H. MYERS ET AL 2,677,346

TELEVISION RECEIVER TUNING INDICATOR

Filed Feb. 19, 1952 2 Sheets-Sheet 2

INVENTORS.
WILLIAM H. MYERS.
CARL REYNOLDS Jr.
BY Alden D. Redfield
ATTORNEY.

Patented May 4, 1954

2,677,346

UNITED STATES PATENT OFFICE 2,677,346

TELEVISION RECEIVER TUNING INDICATOR

William H. Myers, Cincinnati, Ohio, and Carl Reynolds, Jr., Birmingham, Mich., assignors to Avco Manufacturing Corporation, Cincinnati, Ohio, a corporation of Delaware Application February 19, 1952, Serial No. 272,474

3 Claims. (Cl. 116—124.1)

Figure 1:
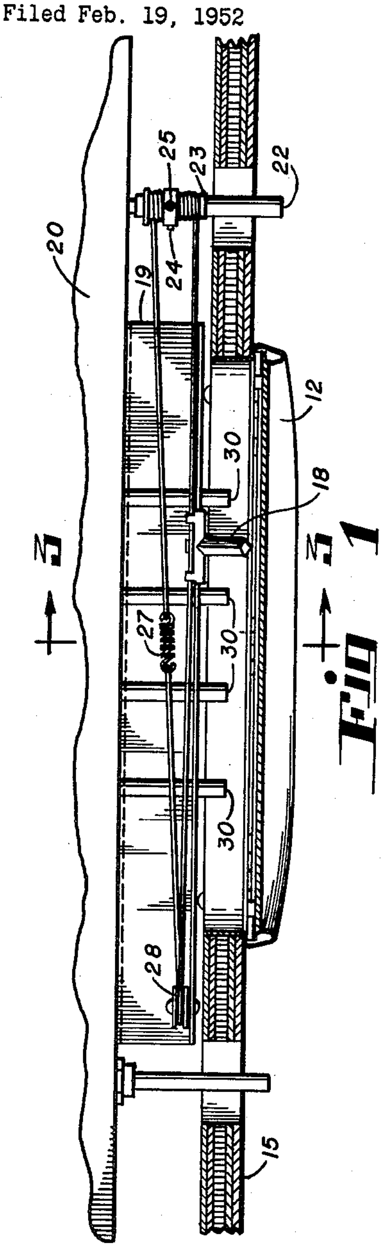

The present invention relates generally to tuning indicators and more specifically to tuning indicators suitable for use with a television receiver circuit.

The complexity of the modern television receiver requires a relatively large number of circuit parameter adjustments for optimum reception. For example, a television receiver must incorporate at least a tuner and a volume control much the same as an ordinary radio receiver. In addition, it is necessary to incorporate some means for adjusting the contrast as well as the over all brightness of the reproduced picture. Practice has further shown that a picture focus control is necessary along with linearity controls in both the horizontal and vertical deflection circuits. Most circuits also required periodic adjustment of other components such as the automatic frequency control and the automatic gain control systems.

Certain ones of these controls need repeated adjustment and for this reason require connecting extension shafts to be brought out through the front cabinet panel in positions of prominence. The tuning control, volume control and contrast control are usually considered as belonging in this category. Other controls which seldom require adjustment need not be so accessible and for this reason, conventionally, may be placed anywhere on the chassis, available only to those skilled in the higher echelons of maintenance. In between these two extremes there is what might be called a group of secondary controls which though not requiring constant attention still must be accessible for periodic adjustment.

It has been the practice to bring out connecting extension shafts through the front of the panel in order to control the parameters of these secondary adjustments; however, the majority of manufacturers have responded to public demand for simplicity by concealing their presence on the front of the panel by means of either a decorative escutcheon plate or a panel door, having no other purpose than to cover over the position of the control shafts. Obviously, the addition of such a panel door or decorative escutcheon plate increases consumer cost and at the same time weakens cabinet construction. It would be desirable to provide some other means for hiding or disguising the position of these secondary parameter control shafts without these and other inherent disadvantages.

Therefore, it is an object of the present invention to supply a decorative structure which is capable of disguising the position of the secondary parameter control shafts and which is also capable of performing some other and more primary receiver function.

It is a further and more specific object of the present invention to provide a structure which not only disguises the position of the secondary parameter control shafts, still leaving them readily accessible, but which also performs the primary function of indicating the selected channel or station.

Briefly, the illustrated embodiment of our invention comprises a dial structure having an indicia plate mounted in indicating relationship with a movable dial pointer. The pointer is actuated conjointly with a conventional television receiver channel selector. The channel selector may be either the preferred continuous tuning type or any other type which is suitable. The dial structure, per se, comprises an indicia plate provided with an opaque portion and a transparent portion. It may be constructed from glass, plastic or any other conventionally suitable material. The moving dial pointer is mounted immediately behind the clear portion of the indicia plate in indicating relationship with the frequency markings or channel numbers as illustrated. The opaque portion of the indicia plate is made large enough to cover the extension shafts connected to secondary parameter control units mounted therebehind. In order to make these controls accessible when desired the indicia plate is supported with relation to the movable pointer and secondary parameter control shafts by hinged mounting means whereby the plate and supporting bezel may be opened and closed. Thus, when the indicia plate is in closed position it serves its primary function of indicating the selected channel or station in accordance with the position of the movable pointer as well as functioning as a decorative means for disguising the position of the secondary control extension shafts. When the indicia plate is in open position the secondary parameter control shafts are accessible for adjustment.

Figure 2:
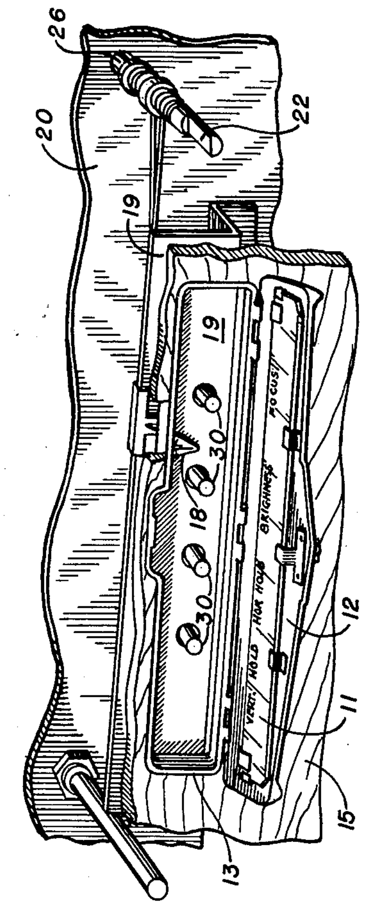
Figure 3:
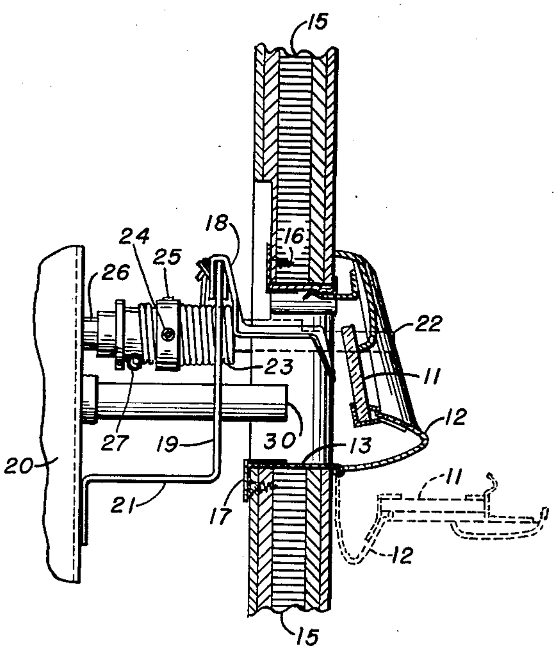
Figure 4:
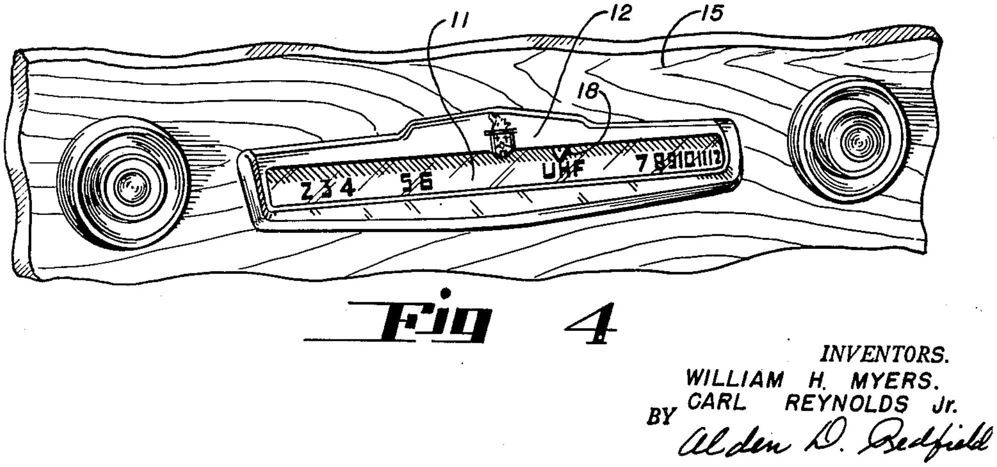

For a better understanding of the present invention together with other and further objects, advantages and capabilities thereof, reference is made to the following disclosure and appended claims in connection with the accompanying drawings, in which:

Fig. 1 is a top view of the complete assembly showing the relative positions of the indicia plate, movable pointer and secondary parameter control shaft extensions, and Fig. 2 is a front view of the assembly with a cutaway section showing how the movable pointer is mounted on the dial background panel through which the secondary parameter control extension shafts protrude. This view also shows the indicia plate in open position whereby the extension shafts are accessible, and Fig. 3 is a sectional view of the assembly, and Fig. 4 is a front view of the assembly with the indicia plate in closed position showing the primary control knobs.

Though the structure to be hereinafter more fully described is primarily designed for use with a television receiver using a continuous type of tuner or channel selector, as contrasted with a turret type of tuner or switch type of channel selector, it is not to be considered specifically limited thereto and it is to be understood that it may be used in television receivers using any type of conventional tuner or channel selector as well as in conventional radio receivers if so desired.

Basically, the structure comprises a slide-rule type of dial having an indicia plate 11 fixedly mounted in a bezel 12. It is to be understood that elements 11 and 12 may be formed in one piece from plastic or some other suitable material if such is desired, rather than in two parts as illustrated. The lower portion of the bezel 12 and the lower portion of frame 13 are formed to provide a hinged coupling 14 therebetween. Frame 13 is formed to fit into an opening cut into panel 15 and is fixedly attached to the panel by fastening means 16 which extend into the rear surface of the panel through mounting tabs 17. Movable pointer 18 is formed so as to be able to slide laterally to and fro along the upper longitudinal edge of dial background plate 19 which may be attached to chassis 20 by other bracket means or as illustrated by shaping the background panel so as to provide a rearward and downward extending flange portion 21 suitable for attachment to chassis 20 by spot welding or fastening means such as metal screws, not shown. Tuner control extension shaft 22 includes a single layer string reservoir which may have included spiral grooves 23 on the front portion thereof suitable for guiding the string into position on the shaft so as to prevent axial shifting of the stored string. Set screws 24 and 25 are provided for holding the tuner extension shaft tightly to tuner shaft 26.

As best seen in Fig. 1 the dial string loop can be considered as starting from tension spring 27, making a plurality of counterclockwise turns around the rear portion of the dial extension shaft 21 and a plurality of counterclockwise turns around the grooved front portion 23 of the extension shaft 21, then on to the movable pointer 18 around pulley 28 back to the other end of tension spring 27. The sliding pointer 18 may be connected to the dial string in any conventional manner well known to those skilled in the art.

Clockwise rotation of channel selector extension shaft 22 stores dial string on the spiral grooved front portion 23 of extension shaft 22 and removes string by way of pulley 28 which was previously stored on the rear portion of extension shaft 22. This moves dial pointer 18 towards extension shaft 22 indicating that the tuner is being adjusted toward the higher frequency television channels 7 through 12. Counterclockwise rotation of extension shaft 22 removes dial string from the forward spiral grooved portion 23 and stores string on the rearward portion of the shaft thus moving dial pointer 18 toward pulley 28, indicating that the channel selector circuits are being tuned toward the lower frequency television channels 2 through 6. Though the actual structure used to slide movable pointer 18 to and fro along the upper edge of dial background plate 19 comprises no part of the present invention, the illustrated dial string reservoir pulley system has been found to be ideally suited for use with our novel structure because it allows the dial pointer to be positioned relative to the secondary control extension shafts in such a manner as to not interfere with their use in making adjustments of the connected circuit parameters. Obviously, other means for moving the pointer may be utilized and such structures will readily occur to those skilled in the art.

Our novel concept generically and basically involves the idea of supporting the dial indicia plate relative to the moving pointer and secondary control extension shafts in such a manner as to provide ready access to these controls without impairing the primary function of the indicia plate which is to indicate the input signal frequency selecting condition of the channel selector or tuner circuit. As best seen in the assembly cross section view of Fig. 3, the secondary control shafts 30 are positioned immediately behind indicia plate 11 when the indicia plate and supporting frame are in closed position and held by the snap fastening means 27. It will be noted that movable pointer 18 is so positioned as to be able to slide to and fro on dial background plate 19 without interference from either the secondary control shafts 30 or indicia plate 11.

As best seen in Fig. 4 when the indicia plate is in closed position the wedge shaped portion of movable pointer 18 can be seen through the transparent portion of plate 11 in indicating position relative to the channel markings on the opaque portion. If adjustment of secondary circuit parameters is desired indicia plate 11 along with bezel 12 may be rotated outwardly and downwardly around the axis of hinge 14 to take the position as best shown in Figs. 2 and 3. It will be noted that the rear surface of the opaque portion of indicia plate 11 may be used for inscribing control nomenclature required for indicating the portion of the television circuit to which each secondary parameter control shaft extension is related.

In the illustrated embodiment it will be noted that the bezel 12 and supported indicia plate 11 are maintained in the open position by gravity, there being no spring or other means counteracting this force. It is appreciated that design requirements may call for a dial structure mounted in some other plane than the one illustrated and that it may be desirable to use either a spring loaded hinge 14 or some other conventional means for maintaining the bezel and indicia plate structure in open position while extension shafts 30 are being adjusted. It is also appreciated that snap fastening means 27 may be eliminated by using a spring loaded hinge for maintaining the bezel and indicia plate structure in closed position. This would eliminate the need for snap fastening means 27. Further, it is also appreciated that dial structures other than the illustrated slide-rule type may be used in connection with our novel concept. For example, the pointer may be made stationary and a movable circular indicia plate connected to one of the primary control shafts. The hollowed out center portion of the circular dial could be designed to provide sufficient room for covering over the necessary secondary parameter control extension shafts with the center portion of the dial being hingedly connected to the remainder of the dial in a manner analogous to that shown in the illustrated embodiment. Other structures utilizing the novel generic concept will now occur to those skilled in the art, and we do not intend to be limited to the specific slide-rule type species as illustrated and disclosed herein.

The advantages of our novel concept should now be apparent. First, we provide a dial structure which performs its primary function of indicating the frequency position of the tuner or channel selector circuit by making a portion of the indicia plate opaque and supporting it by hinged means in indicating relationship with a movable pointer. By so doing, we are able to utilize the dial structure for a second function, i. e., the function of disguising the position of various adjustable parameter control shafts so as to eliminate auxiliary panel openings heretofore considered necessary. Such a structure reduces costs, facilitates cleaning of the transparent portion of the indicia plate and provides a suitable surface for inscribing secondary control nomenclature or nameplate data.

While there has been shown and described what at present is considered the preferred embodiment of the invention, it will become obvious to those skilled in the art that various changes and modifications may be made therein without departing from the invention as defined by the appended claims.

Having thus described our invention, we claim:

1. In combination, a television receiver chassis, a slide rule type of dial structure comprising an indicia plate having a transparent portion and an opaque portion, a bezel formed to support said plate, a frame structure formed to hingedly support said bezel for opening and closing movements about an axis fixed with relation to said television chassis, a movable pointer disposed between said chassis and the transparent portion of said plate in indicating relationship with indicia on the opaque portion of said indicia plate, manual receiver circuit adjustment means disposed immediately behind the space covered by the opaque portion of said indicia plate when said plate is in closed position whereby said adjustment means is inaccessible and hidden from view when said bezel is in closed position and whereby said adjustment means is in view and accessible when said bezel is in open position.

2. In combination, a television receiver chassis, a slide rule type of dial structure comprising an indicia having a transparent portion and an opaque portion, a bezel formed to support said plate, a frame structure formed to hingedly support said bezel for opening and closing movements about an axis fixed with relation to said television chassis, a movable pointer mounted in indicating relationship with indicia on the opaque portion of said indicia plate, manual receiver circuit adjustment means disposed immediately behind the opaque portion of said plate when said plate is in closed position, whereby said adjustment means is inaccessible and hidden from view when said bezel is in closed position and whereby said adjustment means is in view and accessible when said bezel is in open position.

3. In combination with a television receiver, a receiver chassis, a dial structure comprising an indicia plate having a transparent portion and an indicia bearing opaque portion, means for hingedly supporting said plate for opening and closing movements about an axis fixedly spaced from said chassis, a movable pointer supported behind the transparent portion of said plate in indicating relationship with the plate indicia when said plate is in closed position, manual receiver adjustment means disposed immediately behind the opaque portion of said plate when said plate is in closed position, whereby said adjustment means is within view and accessible when said plate is in open position.

References Cited in the file of this patent

UNITED STATES PATENTS

| Number | Name | Date |
|---|---|---|
| D. 103,567 | Fisher | Mar. 16, 1937 |
| D. 156,575 | Stone | Dec. 20, 1949 |
| 1,734,694 | Schwartz | Nov. 5, 1929 |
| 2,606,239 | Beste | Aug. 5, 1952 |